(12) United States Patent
Paleari et al.

(10) Patent No.: US 9,217,097 B2
(45) Date of Patent: Dec. 22, 2015

(54) MULTILAYER HEAT-SHRINKABLE FILM AND CONTAINERS MADE THEREFROM

(75) Inventors: Mario Paleari, Pogliano Milanese (IT); Tiziano Scapoli, Sumirago (IT); Romano Spigaroli, Legnano (IT); Giuliano Zanaboni, Trecate (IT); Flavio Fusarpoli, Rho (IT)

(73) Assignee: CRYOVAC, INC, Duncan, SC (US)

( * ) Notice: Subject to any disclaimer, the term of this patent is extended or adjusted under 35 U.S.C. 154(b) by 104 days.

(21) Appl. No.: 13/991,773

(22) PCT Filed: Dec. 5, 2011

(86) PCT No.: PCT/EP2011/071780
§ 371 (c)(1),
(2), (4) Date: Jun. 5, 2013

(87) PCT Pub. No.: WO2012/076481
PCT Pub. Date: Jun. 14, 2012

(65) Prior Publication Data
US 2013/0251925 A1    Sep. 26, 2013

(30) Foreign Application Priority Data
Dec. 9, 2010 (EP) .................................. 10194429

(51) Int. Cl.
*B32B 27/32* (2006.01)
*C09J 7/02* (2006.01)
*B32B 27/08* (2006.01)
*B32B 27/30* (2006.01)
*B65D 75/00* (2006.01)

(52) U.S. Cl.
CPC ............... *C09J 7/0203* (2013.01); *B32B 27/08* (2013.01); *B32B 27/30* (2013.01); *B32B 27/32* (2013.01); *B65D 75/00* (2013.01); *Y10T 428/1328* (2015.01); *Y10T 428/2826* (2015.01)

(58) Field of Classification Search
CPC ...... B32B 27/08; B32B 27/30; B32B 27/302; B32B 27/304; B32B 27/306; B32B 27/308; B32B 27/32; B32B 27/327; B32B 1/02; B32B 1/08
USPC ........... 428/34.8, 34.9, 35.2, 35.4, 35.7, 36.6, 428/36.7, 36.91, 500, 515–523
See application file for complete search history.

(56) References Cited

U.S. PATENT DOCUMENTS

| | | | |
|---|---|---|---|
| 4,302,565 A | 11/1981 | Goeke et al. | |
| 4,302,566 A | 11/1981 | Karol et al. | |
| 5,026,798 A | 6/1991 | Canich | |
| 6,764,729 B2 | 7/2004 | Ramesh et al. | |
| 6,790,468 B1 | 9/2004 | Mize, Jr. et al. | |
| 2004/0118735 A1 | 6/2004 | Mize et al. | |
| 2009/0116768 A1 | 5/2009 | Huerta et al. | |

FOREIGN PATENT DOCUMENTS

| | | |
|---|---|---|
| EP | 0447988 A1 | 9/1991 |
| EP | 0913338 B1 | 5/1999 |
| WO | 9903670 | 1/1999 |
| WO | 2011062828 A1 | 5/2011 |

*Primary Examiner* — Walter B Aughenbaugh (57) ABSTRACT

A multilayer heat-shrinkable film comprises: a) an outer heat sealable layer; b) a layer comprising a blend of (i) ethylene homopolymer and/or ethylene/alpha-olefin copolymer, and (ii) ethylene vinyl acetate copolymer; c) an internal gas-barrier layer; and d) a layer comprising a blend of (iii) at least one member selected from the group consisting of acrylate-based resin and acrylic acid-based resin, with (iv) at least one member selected from the group consisting of ethylene homopolymer, ethylene/alpha-olefin copolymer and adhesive material.

21 Claims, 2 Drawing Sheets

MULTILAYER HEAT-SHRINKABLE FILM AND CONTAINERS MADE THEREFROM

TECHNICAL FIELD

The present invention relates to multilayer barrier heat shrinkable films and to flexible container structures made from such films, such as bags, pouches and the like, useful for packaging articles, in particular food items, preferably meat.

BACKGROUND ART

For several decades, heat-shrinkable packaging articles have been used for the packaging of a variety of products. Food, particularly meat, has been vacuum packaged in such packaging articles. Through the years, these heat-shrinkable packaging articles have developed higher impact strength and higher seal strength, while simultaneously becoming easier to seal, having improved oxygen and moisture barrier properties, and having higher total free shrink at lower temperatures. High seal strength, high impact strength, and high puncture-resistance are particularly important for the packaging of fresh meat products, as leaking packages are less desirable to consumers and retailers alike. Moreover, leaking packages reduce shelf life by allowing atmospheric oxygen and microbes to enter the package. As a result, the packaging articles used for food packaging, particularly meat packaging, have evolved into being quite tough, and therefore difficult to open. Accordingly tailored films and/or tear propagation initiators have been developed to make these packages easy to open.

US2009116768 discloses multilayer barrier heat shrinkable films which, after being formed as bags or pouches, can be manually opened without the use of a knife or scissors or any other implement. According to this patent application these films are easy tearable due to the presence of at least one layer containing at least one incompatible polymer blend selected from the group consisting of:

(A) a blend of from 90 to 30 weight percent ethylene homopolymer and/or ethylene/alpha-olefin copolymer with from 10 to 70 weight percent ethylene/unsaturated ester copolymer having an unsaturated ester content of at least 10 weight percent;

(B) a blend of ionomer resin with ethylene/unsaturated ester copolymer, and/or polybutylene, and/or propylene homopolymer and/or propylene copolymer (C) a blend of homogeneous ethylene/alpha-olefin copolymer with recycled polymer blend comprising ethylene homopolymer, propylene homopolymer, ethylene copolymer, propylene copolymer, polyamide, ethylene/vinyl alcohol copolymer, ionomer resin, anhydride-modified ethylene/alpha-olefin copolymer, and antiblocking agent; (D) a blend of ethylene/unsaturated ester copolymer with polypropylene and/or propylene/ethylene copolymer, and/or polybutylene, and/or modified ethylene/alpha-olefin copolymer, and/or styrene homopolymer, and/or styrene/butadiene copolymer;

(E) a blend of ethylene/norbornene copolymer with ethylene/unsaturated ester copolymer and/or polypropylene and/or polybutylene; (F) a blend of ethylene/alpha-olefin copolymer with polypropylene and/or polybutylene and/or ethylene/norbornene;

(G) a blend of homogeneous propylene homopolymer and/or homogeneous propylene copolymer with homogeneous ethylene/alpha-olefin copolymer and/or ethylene/unsaturated ester copolymer;

(H) a blend of propylene homopolymer and/or propylene/ethylene copolymer and/or polybutylene with ethylene/methyl acrylate copolymer and/or ethylene/acrylic acid copolymer and/or ethylene/butyl acrylate copolymer;

(I) a blend of polyamide with polystyrene and/or ethylene/alpha-olefin copolymer and/or ethylene/vinyl acetate copolymer and/or styrene/butadiene copolymer; and (J) a blend of polyamide 6 and polyamide 6I6T.

This patent application, among hundreds of theoretically possible blends encompassed within the above very broad definition, is focused on blends of ethylene-alfa olefin copolymers and ethylene vinyl acetate copolymer (VLDPE or LLDPE and EVA). These blends are profusely described, exemplified and also specifically claimed (claim 13) while other blends, such as those of ethylene homopolymer and/or ethylene/alpha-olefin copolymer with ethylene/unsaturated ester copolymer, are completely ignored.

In addition to the above mentioned properties heat-shrinkable barrier packaging films for bags should have good optics, hot wire trimming and knife cutting—i.e. the capability to be cleanly cut on the bag making machine without being deformed or torn—and machinability. In particular, a film is said to have good "machinability" if it can be used with a packaging machine without undue creasing, folding, seal pleats, edge curls, or jamming. All these defects of machinability are even more evident with films of lower thickness and/or in case of diagonal seals such as those present in bags of triangular or V shape, commonly used for packaging pieces of hard cheeses such as grana and parmesan.

The Applicant has found that films comprising blends according to the teaching of US2009116768, i.e. blends of ethylene-alfa olefin copolymers and ethylene vinyl acetate copolymer, are not easily machinable, especially on converting machine for V-shaped article: recurrent defects during converting are pluckering—namely curled seals in particular along angled seals—a difficult removal of the waste material interposed between two subsequent triangular bags and, after cut, an improper formation of the bag chain (i.e. curled bags do not align orderly and are not evenly spaced).

An attribute of a film that may contribute to good machinability is a higher level of stiffness of the film. However, an increase in the modulus (i.e., stiffness) of a film may result in undesirably reduced free shrink and appearance characteristics (e.g., gloss, haze, and total transmission) of the film.

We have surprisingly found that by inserting at least one layer of ethylene/unsaturated ester copolymers or their blends with ethylene homopolymer and/or ethylene/alpha-olefin copolymer in conventional barrier shrinkable packaging films unexpectedly balanced properties result In particular these films are characterized by good optics, high-shrink, smooth linear tearing, high abuse resistance and good mechanics, easy trimming and machinability, especially advantageous in the manufacture of triangular or V-shaped articles.

DISCLOSURE OF INVENTION

A first object of the present invention is a multilayer heat-shrinkable film comprising:

a) an outer heat sealable layer b) at least one layer comprising a blend of ethylene homopolymer and/or ethylene-alfa olefin copolymers and ethylene vinyl acetate copolymer, c) at least one internal gas-barrier layer d) at least one layer comprising a material selected from the group consisting of acrylate-based resin and acrylic acid-based resin, and blends thereof with ethylene homopolymer and/or ethylene/alpha-olefin (E/AO) copolymer and/or adhesive materials.

A second object of the present invention is a heat shrinkable flexible container obtained by self-sealing the film according to the first object above.

A third object of the present invention is a package comprising a product packaged into a flexible container according to the second object above.

A fourth object of the present invention is a process for making a flexible container according to the second object comprising the step of self-sealing a film according to the first object above.

A fifth object of the present invention is a process for making the package of the third object above comprising the steps of: (A) inserting a product into a lay-flat container according to the second object above, said container having at least one unsealed side (B) sealing said at least one unsealed side with at least one heat seal, thereby forming a closed package and (C) heating the heat-shrinkable film to shrink the package around the product.

DEFINITIONS

As used herein, the term "film" is inclusive of plastic web, regardless of whether it is film or sheet.

As used herein, the term "polyolefin" refers to homopolymers, copolymers, including, e.g., bipolymers, terpolymers, etc., having a methylene linkage between monomer units which may be formed by any method known to those skilled in the art. Examples of polyolefins include polyethylene (PE), low-density polyethylene (LDPE), linear low-density polyethylene (LLDPE), very low-density polyethylene (VLDPE), ultra low-density polyethylene (ULDPE), medium-density polyethylene (MDPE), high-density polyethylene (HDPE), ultra high-density polyethylene (UHDPE), ethylene/propylene copolymers, polypropylene (PP), propylene/ethylene copolymer, polyisoprene, polybutylene, polybutene, poly-3-methylbutene-1, poly-4-methylpentene-1, ionomers, polyethylenes comprising ethylene/-olefin which are copolymers of ethylene with one or more -olefins (alphaolefins) such as butene-1, hexene-1, octene-1, or the like as a comonomer, and the like.

As used herein, the phrase "ethylene/-olefin" (E/AO) refers to a modified or unmodified copolymer produced by the co-polymerization of ethylene and any one or more -olefin. The -olefin in the present invention may have between 3-20 pendant carbon atoms. The co-polymerization of ethylene and an -olefin may be produced by heterogeneous catalysis, i.e., co-polymerization reactions with Ziegler-Natta catalysis systems, for example, metal halides activated by an organometallic catalyst, i. e., titanium chloride, optionally containing magnesium chloride, complexed to trialkyl aluminum and may be found in patents such as U.S. Pat. No. 4,302,565 to Goeke et al. and U.S. Pat. No. 4,302,566 to Karol, et al., both of which are hereby incorporated, by reference thereto, in their entireties. Heterogeneous catalyzed copolymers of ethylene and an -olefin may include linear low-density polyethylene, very low-density polyethylene and ultra low-density polyethylene. These copolymers of this type are available from, for example, The Dow Chemical Company, of Midland, Mich., U.S.A. and sold under the trademark DOWLEX resins. Additionally, the co-polymerization of ethylene and a -olefin may also be produced by homogeneous catalysis, for example, co-polymerization reactions with metallocene catalysis systems which include constrained geometry catalysts, i.e., monocyclopentadienyl transition-metal complexes taught in U.S. Pat. No. 5,026,798 to Canich, the teachings of which are incorporated herein by reference. Homogeneous catalyzed ethylene/-olefin copolymers (E/AO) may include modified or unmodified ethylene/-olefin copolymers having a long-chain branched (8-20 pendant carbons atoms) -olefin comonomer available from The Dow Chemical Company, known as AFFINITY and ATTANE resins, TAFMER linear copolymers obtainable from the Mitsui Petrochemical Corporation of Tokyo, Japan, and modified or unmodified ethylene/-olefin copolymers having a short-chain branched (3-6 pendant carbons atoms) -olefin comonomer known as EXACT resins obtainable from ExxonMobil Chemical Company of Houston, Tex., U.S.A.

As used herein, the phrase "acrylic acid-based resin" refers to homopolymers and copolymers having an acrylic acid and/or a methacrylic acid linkage between monomer unit. These monomer units have the general formula: $[H_2C=C](R)(CO_2H)$ where $R=H$, alkyl group. Acrylic acid-based resins may be formed by any method known to those skilled in the art and may include polymerization of acrylic acid, or methacrylic acid in the presence of light, heat, or catalysts such as benzoyl peroxides, or by the esters of these acids, followed by saponification. Examples of acrylic acid-based resins include, but are not limited to, ethylene/acrylic acid copolymer (EAA), ethylene/methacrylic acid copolymer (E/MAA), and blends thereof.

As used herein, the phrase "acrylate-based resin" refers to homopolymers and copolymers having an ester of acrylic acid linkage between the monomer unit. The acrylic acid monomer unit can be represented by the general formula: $[H_2C=C](R)(CO_2R')$ where $R=H$, alkyl group and $R'=$same or different alkyl group as R. Acrylate-based resins may be formed by any method known to those skilled in the art, such as, for example, polymerization of the acrylate monomer by the same methods as those described for acrylic acid-based resins. Examples of acrylate-based resin include, but are not limited to, methyl/methacrylate copolymer (MMA), ethylene/vinyl acrylate copolymer (EVA), ethylene/methacrylate copolymer (EMA), ethylene/n-butyl acrylate copolymer (EnBA), and blends thereof.

As used herein, the term "adhesive" refers to a polymer material serving a primary purpose or function of adhering two surfaces to one another. In the present invention, the adhesive may adhere one layer to another layer. The adhesive may comprise any polymer, copolymer or blend of polymers including modified and unmodified polymers, e.g., grafted copolymers, which provide sufficient interlayer adhesion to adjacent layers comprising otherwise nonadhering polymers.

As used herein, the term "EVA" refers to ethylene and vinyl acetate copolymers. The vinyl acetate monomer unit can be represented by the general formula: $[CH_3COOCH=CH_2]$.

As used herein, the term "polymer" refers to the product of a polymerization reaction, and is inclusive of homopolymers, copolymers, terpolymers, etc. In general, the layers of a film or film substrate can consist essentially of a single polymer, or can have still additional polymers together therewith, i. e., blended therewith.

As used herein, the term "copolymer" refers to polymers formed by the polymerization of reaction of at least two different monomers. For example, the term "copolymer" includes the co-polymerization reaction product of ethylene and an -olefin, such as 1-hexene. The term "copolymer" is also inclusive of, for example, the co-polymerization of a mixture of ethylene, propylene, 1-propene, 1-butene, 1-hexene, and 1-octene. As used herein, a copolymer identified in terms of a plurality of monomers, e.g., "propylene/ethylene copolymer", refers to a copolymer in which either a monomer may copolymerize in a higher weight or molar percent than the other monomer or monomers. However, the first listed monomer preferably polymerizes in a higher weight percent than the second listed monomer.

As used herein, the phrase "flexible container" is inclusive of end-seal bags, side-seal bags, L-seal bags, U-seal bags (also referred to as "pouches"), gusseted bags, backseamed tubings, and seamless casings.

As used herein, the term "package" is inclusive of packages made from such containers by placing a product in the container and sealing the container so that the product is substantially surrounded by the heat-shrinkable multilayer film from which the packaging container is made.

As used herein, the phrase "machine direction" refers to the direction in which the film emerges from the die. Of course, this direction corresponds with the direction the extrudate is forwarded during the film production process. The phrase "machine direction" corresponds with "longitudinal direction". Machine direction and longitudinal direction are abbreviated as "MD" and "LD", respectfully.

As used herein, the phrase "transverse direction" refers to a direction perpendicular to the machine direction. Transverse direction is abbreviated as "TD".

As used herein, the term "bag" refers to a packaging container having an open top, side edges, and a bottom edge. The term "bag" encompasses lay-flat bags, pouches, casings (seamless casings and backseamed casings, including lap-sealed casings, fin-sealed casings, and butt-sealed backseamed casings having backseaming tape thereon). Various casing configurations are disclosed in U.S. Pat. No. 6,764,729 and various bag configurations, including L-seal bags, backseamed bags, and U-seal bags (also referred to as pouches), are disclosed in U.S. Pat. No. 6,790,468.

As used herein, the term "Extrusion lamination" or "extrusion coating" refers to processes by which a film of molten polymer is extruded onto a solid substrate (e.g., a nonwoven), in order to coat the substrate with the molten polymer film to bond the substrate and film together. "Joined" refers to configurations whereby an element is directly secured to another element by affixing the element directly to the other element and to configurations whereby an element is indirectly secured to another element by affixing the element to intermediate member(s) which in turn are affixed to the other element. Materials may be joined by one or more bonding processes including adhesive bonding, thermal welding, solvent welding, ultrasonic bonding, extrusion bonding, and combinations thereof.

As used herein, the term "oriented" refers to a thermoplastic web which forms a film structure in which the web has been elongated in either one direction ("uniaxial") or two directions ("biaxial") at elevated temperatures followed by being "set" in the elongated configuration by cooling the material while substantially retaining the elongated dimensions. This combination of elongation at elevated temperatures followed by cooling causes an alignment of the polymer chains to a more parallel configuration, thereby improving the mechanical properties of the polymer web. Upon subsequently heating of certain unrestrained, unannealed, oriented sheet of polymer to its orientation temperature, heat shrinkage may be produced.

DETAILED DESCRIPTION OF THE INVENTION

A first object of the present invention is a multilayer heat-shrinkable film comprising:
a) an outer heat sealable layer
b) at least one layer comprising a blend of ethylene homopolymer and/or E/AO copolymers and EVA copolymer,
c) at least one internal gas-barrier layer
d) at least one layer comprising a material selected from the group consisting of acrylate-based resin and acrylic acid-based resin, and blends thereof with ethylene homopolymer and/or ethylene/alpha-olefin (E/AO) copolymer and/or adhesive materials.

In the multilayer heat-shrinkable film first object of the present invention:
a) the outer heat sealable layer is a food-contact layer comprising at least a polyolefin or an E/AO copolymer and their blends, preferably a blend of homogeneous E/AO copolymers or a blend of homogeneous E/AO copolymer and linear low density polyethylene (LLDPE), or blends of homogeneous E/AO copolymer with EVA, EMA, PO block copolymers;

(b) the at least one layer comprises a blend of ethylene homopolymer and/or E/AO copolymers and EVA copolymer, preferably a blend of from 90 to 30 weight percent of ethylene homopolymer and/or E/AO copolymer with from 10 to 70 weight percent of EVA, more preferably from 80 to 50 weight percent of ethylene homopolymer and/or E/AO copolymer with from 20 to 50 weight percent of EVA, even more preferably from 75 to 65 weight percent of ethylene homopolymer and/or E/AO copolymer with from 25 to 35 weight percent of EVA. Preferably the EVA copolymers have a vinyl acetate content from 4% to 28%, more preferably from 9 to 18%;

(c) the internal gas-barrier layer comprises a polymer selected among polyvinyl alcohol copolymers (PV/A), ethylene/vinyl alcohol copolymers (EVOH), polyvinyl chlorides (PVC), polyvinylidene chloride copolymers (PVDC), polyvinylidene chloride/vinylchloride copolymers (PVDC-VC), polyvinylidene chloride/methyl acrylate copolymers (PVDC/MA), blends of polyvinylidene chloride/vinylchloride copolymers (PVDC/VC) and polyvinylidene chloride/methyl acrylate copolymers-(PVDC/MA), blends of PVdC and polycaprolactone (as those described in patent EP2064056 B1, example 1 to 7, and resulting particularly useful for respiring food products as some cheeses), polyester homopolymers and copolymers, polyamide homopolymers and copolymers, preferably polyvinylidene chloride copolymers (PVDC), polyvinylidene chloride/vinylchloride copolymers (PVDC/VC), polyvinylidene chloride/methyl acrylate copolymers (PVDC/MA);

(d) the at least one layer comprises a material selected from the group consisting of acrylate-based resin and acrylic acid-based resin, and blends thereof with ethylene homopolymer and/or ethylene/alpha-olefin (E/AO) copolymer and/or adhesive materials.

Preferably, the acrylic acid-based resin may comprise a material selected from the group consisting of ethylene/acrylic acid copolymer (E/AA), ethylene/methacrylic acid copolymer (E/MAA), and blends thereof, being E/MAA particularly preferred. Preferably, the acrylate-based resin may comprise a material selected from the group consisting of methyl/methacrylate copolymer (M/MA), ethylene/vinyl acrylate copolymer (E/VA), ethylene/methacrylate copolymer (E/MA), ethylene/n-butyl acrylate copolymer (E/nBA), and blends thereof.

The adhesive material may comprise any polymer, copolymer or blend of polymers including modified and unmodified polymers, e.g., grafted copolymers, which provide sufficient adhesion. Non limiting examples of adhesive materials are EVA, or Polyolefin (EVA, LLDPE, EMA) grafted with Maleic Anhydride.

Blends of acrylic/acrylate resin with ethylene homopolymer and/or ethylene/alpha-olefin (E/AO) copolymer and/or adhesive materials are preferred, in particular blends in which the acrylic/acrylate resin is from 80 to 20 percent by weight, more preferably from 70 to 30 percent by weight, even more preferably from 50 to 35 percent by weight. Blends of acrylic/acrylate resins with ethylene homopolymer and/or ethylene/alpha-olefin (E/AO) copolymer are more preferred, blends of acrylic acid-based resin with ethylene homopolymer and/or ethylene/alpha-olefin (E/AO) copolymer are even more preferred.

Layer d) is preferably an internal layer, more preferably is between the outer heat sealable layer a) and the internal gas-barrier layer c).

The multilayer heat-shrinkable film first object of the present invention may further comprise:

e) at least one internal layer comprising an adhesive material and/or EVA. In case the at least one internal layer e) comprises EVA, ethylene/vinyl acetate copolymers with a vinyl acetate (VA) content from 4 to 28 percent by weight are preferred, from 9 to 18 percent by weight are more preferred.

f) an outer skin layer comprising at least a polyolefin or an E/AO copolymer and their blends, preferably a blend of homogeneous E/AO copolymer and linear low density polyethylene (LLDPE). The outer skin layer f), if present, can have the same or a different composition in respect of the outer heat sealable layer a), preferably the same composition.

The multilayer heat-shrinkable film first object of the present invention has been oriented in the solid state, preferably has been biaxially oriented and can have a free shrink in L and/or T direction, as measured as described in the experimental part of at least 20% in at least one of longitudinal or transversal direction, preferably of at least 25%, more preferably of at least 30% at 80° C.

The multilayer heat-shrinkable film first object of the present invention comprises at least a gas-barrier layer, and can exhibit an oxygen transmission rate (OTR) lower than 50, preferably lower than 30, more preferably lower than 20 cc/m$^2$ day atm at 23° C. and 0% relative humidity.

Alternatively, the multilayer heat-shrinkable film first object of the present invention comprises at least a gas-barrier layer, and can exhibit an oxygen transmission rate (OTR) ranging from 50 to 500, preferably from 120 to 450, more preferably from 180 to 450 cc/m$^2$ day atm at 23° C. and 0% relative humidity.

The multilayer heat-shrinkable film first object of the present invention comprises both symmetrical and asymmetrical sequences, with a number of layers of from 4 to 9, preferably of from 5 to 7, more preferably of 6.

The multilayer heat-shrinkable film, first object of the present invention, preferably have a total thickness from 20 µm to 110 µm, more preferably from 30 µm to 90 µm, even more preferably from 35 µm to 50 µm.

In an embodiment the multilayer heat-shrinkable film according to the first object of the present invention comprises:

a) an outer heat sealable layer
b) at least one layer comprising a blend of ethylene homopolymer and/or E/AO copolymers and EVA copolymer,
c) at least one internal gas-barrier layer comprising polyvinylidene chloride copolymers (PVDC), polyvinylidene chloride/vinylchloride copolymers (PVDC/VC), polyvinylidene chloride/methyl acrylate copolymers (PVDC/MA)
d) at least one layer comprising a material selected from the group consisting of acrylate-based resin and acrylic acid-based resin, and blends thereof with ethylene homopolymer and/or ethylene/alpha-olefin (E/AO) copolymer and/or adhesive materials.

In another embodiment the multilayer heat-shrinkable film according to the first object of the present invention comprises:

a) an outer heat sealable layer
b) at least one layer comprising a blend of ethylene homopolymer and/or E/AO copolymers and EVA copolymer,
c) at least one internal gas-barrier layer comprising polyvinylidene chloride copolymers (PVDC), polyvinylidene chloride/vinylchloride copolymers (PVDC/VC), polyvinylidene chloride/methyl acrylate copolymers (PVDC/MA)
d) at least one layer comprising an acrylic acid-based resin, and blends thereof with ethylene homopolymer and/or ethylene/alpha-olefin (E/AO).

In another embodiment the multilayer heat-shrinkable film according to the first object of the present invention comprises:

a) a blend of homogeneous E/AO copolymers or a blend of homogeneous E/AO copolymer and linear low density polyethylene (LLDPE),
b) at least one layer comprising a blend of ethylene homopolymer and/or E/AO copolymers and EVA copolymer,
c) at least one internal gas-barrier layer comprising polyvinylidene chloride copolymers (PVDC), polyvinylidene chloride/vinylchloride copolymers (PVDC/VC), polyvinylidene chloride/methyl acrylate copolymers (PVDC/MA);
d) at least one internal layer comprising a material selected from the group consisting of acrylate-based resin and acrylic acid-based resin, and blends thereof with ethylene homopolymer and/or ethylene/alpha-olefin (E/AO) copolymer and/or adhesive materials.

In another embodiment the multilayer heat-shrinkable film according to the first object of the present invention comprises:

a) an outer heat sealable layer
b) at least one layer comprising a blend of ethylene homopolymer and/or E/AO copolymers and EVA copolymer,
c) at least one internal gas-barrier layer
d) at least one layer comprising a material selected from the group consisting of acrylate-based resin and acrylic acid-based resin, and blends thereof with ethylene homopolymer and/or ethylene/alpha-olefin (E/AO) copolymer and/or adhesive materials, and
e) at least one internal layer comprising EVA In a preferred embodiment the multilayer heat-shrinkable film according to the first object of the present invention comprises:

a) an outer heat sealable layer comprising a blend of homogeneous E/AO copolymers or a blend of homogeneous E/AO copolymer and linear low density polyethylene (LLDPE);
b) at least one layer comprising a blend of from 80 to 50 weight percent of ethylene homopolymer and/or E/AO copolymer with from 20 to 50 weight percent of EVA, preferably from 75 to 65 weight percent of ethylene homopolymer and/or E/AO copolymer with from 25 to 35 weight percent of EVA;

c) at least one internal gas-barrier layer comprising polyvinylidene chloride copolymers (PVDC), polyvinylidene chloride/vinylchloride copolymers (PVDC/VC), polyvinylidene chloride/methyl acrylate copolymers (PVDC/MA);

d) at least one internal layer placed between the outer heat sealable layer a) and the internal gas-barrier layer c) comprising a material selected from the group consisting of acrylate-based resin and acrylic acid-based resin, and blends thereof with ethylene homopolymer and/or ethylene/alpha-olefin (E/AO) copolymer, and e) at least one internal layer comprising EVA.

In the most preferred embodiment the multilayer heat-shrinkable film according to the first object of the present invention comprises a) an outer heat sealable layer comprising a blend of homogeneous E/AO copolymers;

b) one layer comprising a blend of from 75 to 65 weight percent of ethylene homopolymer and/or E/AO copolymer with from 25 to 35 weight percent of EVA;

c) one internal gas-barrier layer comprising polyvinylidene chloride copolymers (PVDC), polyvinylidene chloride/vinylchloride copolymers (PVDC/VC), polyvinylidene chloride/methyl acrylate copolymers (PVDC/MA);

d) one internal layer placed between the outer heat sealable layer a) and the internal gas-barrier layer c) comprising an acrylic acid-based resin, and blends thereof with ethylene homopolymer and/or ethylene/alpha-olefin (E/AO) copolymer, and e) two internal layers comprising EVA.

The multilayer heat-shrinkable film according to the first object of the present invention can be manufactured by co-extrusion or extrusion coating, using either a flat or a circular film die that allows to shape the polymer melt into a thin film or tube.

The orientation step can be performed by the so-called trapped-bubble process, which is a widely known process typically used for the manufacture of heat-shrinkable films.

According to said process, the multilayer film is co-extruded through a round die to obtain a tube of molten polymer which is quenched immediately after extrusion without being expanded, optionally cross-linked, then heated to a temperature which is above the Tg of all the resins employed and below the melting temperature of at least one of the resins employed, typically by passing it through a hot water bath or heating it with an IR oven or with hot air, and expanded, still at this temperature by internal air pressure to get the transversal orientation and by a differential speed of the pinch rolls which hold the thus obtained "trapped bubble" to provide the longitudinal orientation.

The film is then rapidly cooled to somehow freeze the molecules of the film in their oriented state and wound.

Furthermore in some instances it may be desirable to submit the oriented structure to a controlled heating-cooling treatment (so-called annealing) that is aimed at having a better control on low temperature dimensional stability of the heat-shrinkable film.

While orientation is typically carried out in both directions, mono-oriented films or preferentially oriented films can be obtained by avoiding or controlling transversal or longitudinal orientation.

Alternatively the oriented film may also be prepared by flat co-extrusion followed by orientation in one or both directions via tenter-frame and optionally annealing. Orientation may be carried out in such a case either sequentially or simultaneously.

Depending on the number of layers in the final structure it may be advisable or necessary to split the co-extrusion step: in such a case a tube or a sheet is first formed of a limited number of layers; this tube or sheet is then quenched quickly and before submitting it to the orientation step it is extrusion-coated with the remaining layers.

The coating step can be simultaneous, by coextruding all the remaining layers altogether, so as to simultaneously adhere all of them, one over the other, to the quenched tube or sheet obtained in the first extrusion step, or this coating step can be repeated as many times as the layers which are to be added.

If desired, the film may be cross-linked, either chemically or, preferably, by irradiation. Typically to produce cross-linking, an extrudate is treated with a suitable radiation dosage of high energy electrons, preferably using an electron accelerator, with the dosage level being determined by standard dosimetry methods. A suitable radiation dosage of high-energy electrons is in the range of up to about 120 kGy, more preferably about 16-80 kGy, and still more preferably about 34-64 kGy. Other accelerators such as a Van der Graff generator or resonating transformer may be used.

The radiation is not limited to electrons from an accelerator since any ionizing radiation may be used.

Irradiation is preferably performed prior to orientation, and it is carried out either on the overall co-extruded or extrusion-coated tape, or preferably, on the primary extruded tape before extrusion coating. Irradiation could however be performed also after orientation.

A second object of the present invention is a heat shrinkable flexible container obtained by self-sealing the film according to the first object above.

The self sealing of the film according to the present invention can be accomplished in a fin seal and/or lap seal mode, preferably by having the outer heat sealable layer a) heat sealed to itself, i.e. in a fin seal mode.

The heat-shrinkable flexible container can be an end-seal bag (ES), a side (or transverse TS) seal bag or a pouch In one embodiment, the flexible container is a lay-flat, end-seal bag made from a seamless tubing, the end-seal bag having an open top, first and second folded side edges, and an end seal across a bottom of the bag.

Figure 1:
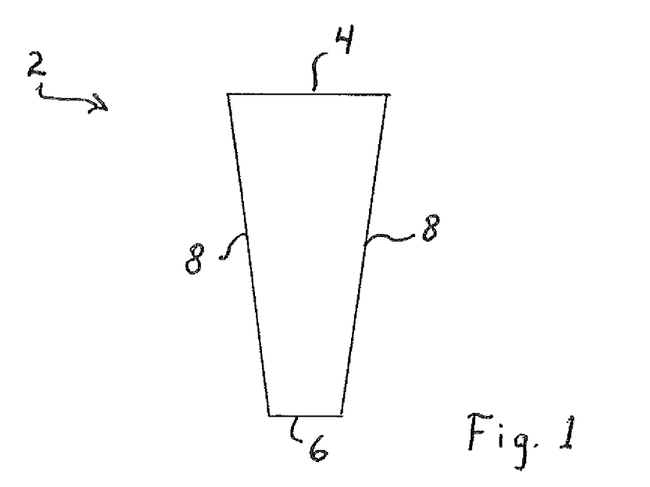
FIG. 1 is a schematic of a first embodiment of a V-shaped side-seal bag made from a seamless tubing.
Figure 2:
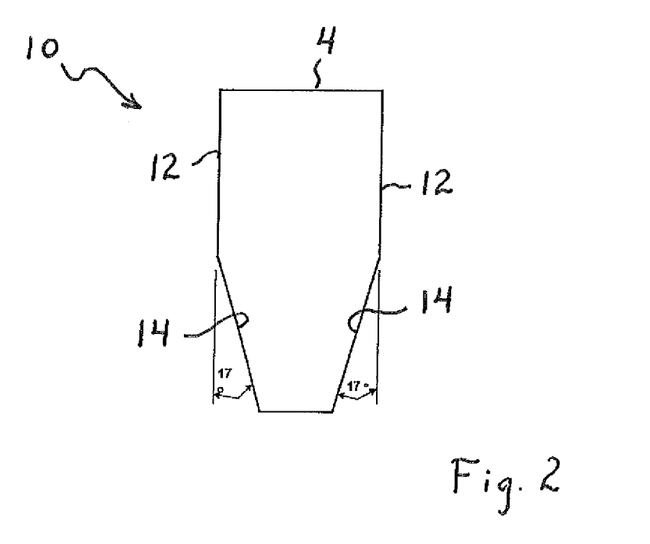
FIG. 2 is a schematic of an alternative embodiment of an alternative side-seal bag having a trapezium-like shape.

In one embodiment, the flexible container is a lay-flat, side-seal bag made from a seamless tubing, the side-seal bag having an open top, a folded bottom edge, and first and second side seals In one embodiment, the flexible container is a lay-flat, V-shaped side-seal bag 2 made from a seamless tubing, the side-seal bag 2 having an open top 4, a folded bottom edge 6, and first and second side seals 8. Said first and second side seals 8 can be completely angled with respect to the open top 4, thus providing a triangular or almost triangular bag 2 (FIG. 1) or, preferably, alternative bag 12 has partially straight seals (12) (i.e. perpendicular to the open top 4) and partially angled seals 14, conferring a more trapezium-like shape (FIG. 2).

In case of trapezium-like shaped bags the side seals are preferably angled of 10-25°, more preferably of 15-20°, even more preferably of about 17°. Preferably the straight seals 12 and the angled seals 14 are of comparable length.

In one embodiment, the flexible container is a lay-flat pouch made by heat sealing two flat films to one another, the pouch having an open top, a first side seal, a second side seal and a bottom seal.

The flexible container optionally comprises at least one tear initiator.

Figure 3:
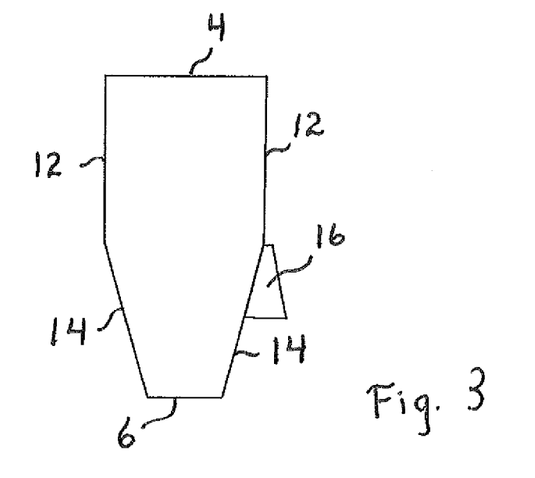
FIG. 3 is a schematic of a side-seal bag having a trapezium-like shape and having a tear initiator in the form of a triangular flap.
Figure 4:
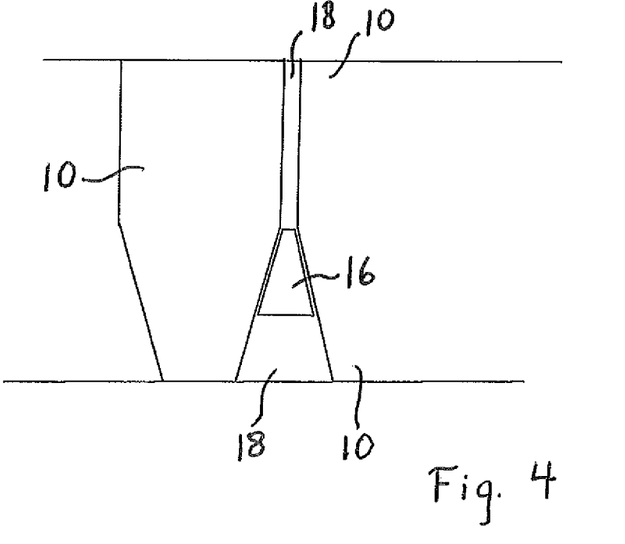
FIG. 4 is a schematic illustration of the manufacture of bags, with a triangular flap between two bags having the trapezium-like shape.

In case of trapezium-like shaped bags 10 the tear initiator is preferably a triangular flap or tab 16 as illustrated in FIG. 3. Said flap 16 can be advantageously manufactured by using the waste film 18 between two subsequent triangular or V-shaped bags 10—as depicted in FIG. 4—with minor modifications of the sealing bars. This flap 16, even after the heat-shrinking step, ensures an easy grip and a good tear initiation.

A third object of the present invention is a package comprising a product packaged into a flexible container according to the second object above.

A fourth object of the present invention is a process for making a flexible container according to the second object comprising the step of self-sealing a film according to the first object above.

The flexible container according to the second object of the present invention can be an ES bag (end-seal bag), obtainable from a flattened tubing of thermoplastic material by transversely sealing and severing the bottom end of the bag, or a TS bag (transverse seal bag), typically obtained by folding longitudinally a flat film and sealing and severing it transversely. In both the ES and TS bags currently available on the market, the seals are fin seals i. e. seals where one surface of the packaging film is always sealed to itself.

Another method of packaging food and non-food products is by means of pouches made on formfill-seal machines, such as a Horizontal Form-Fill-Seal (HFFS) or a Vertical Form-Fill Seal (VFFS) machine.

A FFS machine, either Horizontal or Vertical, typically includes a former for forming a flat web of film into a tubular configuration, a longitudinal sealer to seal the overlapped longitudinal edges of the film in the tubular configuration, a conveyor for feeding the products into the tubular film one after the other in suitably spaced configuration, or a feeding tube in case of a VFFS machine, and a transverse sealer for sealing the tubular film in a cross-wise direction to separate the products into discrete packages.

The transverse sealer may be operated to simultaneously seal the bottom of the leading pouch and the front of the following pouch and sever the two seals as well as the leading package from the front sealed tubing.

Alternatively, in the HFFS process, the transverse seal may be operated to sever the leading package from the following tubular portion and sealing the front of said tubular portion thus creating the sealed bottom of the next leading pouch. In this way the leading pouch containing the product to be packaged has a longitudinal seal and only one transverse seal. It can then be vacuumized before a second transverse seal hermetically closes it. Also in this case, the oriented heat-shrinkable thermoplastic film of the present invention is employed as the packaging material and the vacuumized package is then shrunk to achieve the desired presentation/appearance.

In the FFS processes, while the transverse seals are always fin seals, the longitudinal seal can be either a fin seal or a lap seal, i. e. a seal where the innermost layer of the film is sealed to the outermost layer of the same film.

Also in this case, as in the manufacture of ES or TS bags, the resins used for the thermoplastic packaging material and in particular for the outer sealing layers are selected in such a way to provide high seal strengths. This in fact guarantees that the final flexible container will suitably protect the packaged product from the outside environment, without accidental openings or leakers.

A fifth object of the present invention is a process for making the package of the third object above comprising the steps of: (A) inserting a product into a lay-flat container according to the second object above, said container having at least one unsealed side; (B) optionally vacuumizing and/or gas-flushing the loaded container; (C) sealing said at least one unsealed side with at least one heat seal, thereby forming a closed package and (D) heating the heat-shrinkable film to shrink the package around the product.

The present invention will now be described in more detail with particular reference to the following Examples.

The following abbreviations are used:
VLD: Very Low Density
VA: vinyl acetate
VLDPE 1: VLD Et/Oct Copolymer branched, single site, Density (23° C.) 0.900 g/cm$^3$; Melt Flow Rate 190°, 6.0 g/10 min (measured by ASTM D1238-Condition E); Melting point (010° C./Min) 99° C. (AFFINITY PL 1281G1 by Dow)
VLDPE 2: VLD Et/Oct Copolymer linear, single site, Density 0.910 g/cm$^3$; Melt Flow Rate 190° C., 6.6 g/10 min (measured by ASTM D1238-Condition E); (EXACT 1007 by DEX plastomers)
VLDPE 3: VLD Et/Oct Copolymer branched, single site, Density 0.904 g/cm$^3$; Melt Flow Rate 190° C., 1 g/10 min (measured by ASTM D1238-Condition E); Melting point 100° C.; Vicat softening 88° C.; (AFFINITY PL 1881G by Dow);
LLDPE1: LLD Et/Oct Copolymer branched, single site, Density (Liquid) 0.902 g/cm$^3$; Melt Flow Rate 190° C., 1.1 g/10 min (measured by ASTM D1238-Condition E); melting point 99° C.; Vicat softening point 86° C.; (AFFINITY PL 1880G by Dow)
EVA1: Ethylene/Vinyl Acetate Copolymer, 18% VA comonomer, Density 0.9400 g/cm$^3$; Melt Flow Rate 190° C., 0.70 g/10 min (measured by ASTM D1238-Condition E); Melting point (010° C./Min) 87° C.; (ELVAX 3165 by Du Pont);
EVA2: Ethylene/Vinyl Acetate Copolymer, 13.5% VA comonomer; Density 0.935 g/cm$^3$; Melt Flow Rate 190°, 0.38 g/10 min (measured by ASTM D1238-Condition E); Melting point 93° C.; (1003 VN 4 by Total Petrochemicals);
EVA3: Ethylene/Vinyl Acetate Copolymer 9.4 wt % comonomer VA; Density 0.9280 g/cm$^3$; Melt Flow Rate 190° C., 9 g/10 min measured by ASTM D1238-Condition E); (ESCORENE ULTRA FL00909 by Exxon)
EVA4: Maleic Anhydride-Modified Ethylene/Vinyl Acetate Copolymer, 18% VA comonomer, Density 0.945 g/cm3; Melt Flow Rate 190° C., 7 g/10 min (measured by ASTM D1238-Condition E); Melting point 85° C. (OREVAC 9318 by Arkema);
EMAA1: Ethylene/Methacrylic Acid Copolymer, 12% comonomer, Density 0.94 g/cm$^3$; Melt Flow Rate 190° C. 1.2-1.8 g/10 min min (measured by ASTM D1238-Condition E); Melting point 95° C.; (NUCREL 1202 by Du Pont);
VdC/MA: Vinylidene Chloride/Methyl Acrylate Copolymer, Methyl Acrylate comonomer content 8.1%; Density 1.71 g/cm$^3$; (IXAN PV910 by SolVin);
VdC/MA/VC: blend of Vinylidene Chloride/Methyl Acrylate Copolymer and Vinylidene Chloride/Vinyl Chloride Copolymer, Density 1.71 g/cm$^3$; (IXAN PVS815 by SolVin);

EXAMPLE 1

A six-layer film has been prepared by extrusion coating through a round die.

A substrate formed of the following layers (a)/(d)/(e) wherein the heat-sealing layer (a) is the innermost layer of the tube, has been co-extruded, quickly quenched with a water cascade, irradiated at a dosage level of 64 kGy and coated with the sequence of three layers, (c)/(e)/(b), wherein layer (b) is the outermost layer of the overall tube. The extrusion coated tape has then been quenched, re-heated by passing it through a water bath at about 95-98° C., and oriented at this temperature (with orientation ratios of about 3.7:1 in the longitudinal direction and about 4.0:1 in the transverse direction) by the trapped-bubble process.

The sequence of layers (from the innermost heat-sealing layer (a) to the outermost layer (b), wherein the resins used for the different layers and, between parentheses, the thickness in microns of each layer are reported below, is as follows:
(a) 80% VLDPE1+20% VLDPE2 (9.1)/
(d) 70% LLDPE1+30% EMAA1 (13)/
(e) EVA1 (6.8)/
(c) VdC/MA (4.2)/
(e) EVA1 (3.8)/
(b) 70% VLDPE3+30% EVA2 (8.7)
Total thickness 46 μm

EXAMPLE 2

A six-layer film has been prepared substantially according to example 1 with the substrate sequence (a)/(d)/(e), wherein the heat-sealing layer (a) is the innermost layer of the tube, and a coating of three layers, (c)/(e)/(b), wherein layer (b) is the outermost layer of the overall tube.

The sequence of layers (from the innermost heat-sealing layer (a) to the outermost layer (b), wherein the resins used for the different layers and, between parentheses, the thickness in microns of each layer are reported below, is as follows:
(a) 80% VLDPE1+20% VLDPE2 (9.0)/
(d) 60% LLDPE1+40% EMAA1 (12.8)/
(e) EVA1 (6.8)/
(c) VdC/MA (4.6)/
(e) EVA1 (3.8)/
(b) 70% VLDPE3+30% EVA2 (8.2)
Total thickness 45.2 μm

EXAMPLE 3

A six-layer film has been prepared substantially according to example 1 with the substrate sequence (a)/(d)/(e), wherein the heat-sealing layer (a) is the innermost layer of the tube, and a coating of three layers, (c)/(e)/(b), wherein layer (b) is the outermost layer of the overall tube.

The sequence of layers (from the innermost heat-sealing layer (a) to the outermost layer (b), wherein the resins used for the different layers and, between parentheses, the thickness in microns of each layer are reported below, is as follows:
(a) 80% VLDPE1+20% VLDPE2 (9.0)/
(d) 60% LLDPE1+40% EMAA1 (12.8)/
(e) EVA1 (6.8)/
(c) VdC/MA/VC (4.6)/
(e) EVA1 (3.8)/
(b) 70% VLDPE3+30% EVA2 (8.2)
Total thickness 45.2 μm

EXAMPLE 4

A six-layer film has been prepared substantially according to example 1 with the substrate sequence (a)/(b1)/(e), wherein the heat-sealing layer (a) is the innermost layer of the tube, and a coating of three layers, (c)/(d)/(b), wherein layer (b) is the outermost layer of the overall tube.

The sequence of layers (from the innermost heat-sealing layer (a) to the outermost layer (b), wherein the resins used for the different layers and, between parentheses, the thickness in microns of each layer are reported below, is as follows:
(a) 80% VLDPE1+20% VLDPE2 (9.1)/
(b1) 70% LLDPE1+30% EVA2 (13)/
(e) EVA1 (6.8)/
(c) VdC/MA (4.2)/
(d) 70% EMAA1+30% EVA4 (3.8)
(b) 70% VLDPE3+30% EVA2 (8.7)
Total thickness 46 μm

EXAMPLE 5

A seven-layer film has been prepared substantially according to example 1 with the substrate sequence (a)/(b)/(e), wherein the heat-sealing layer (a) is the innermost layer of the tube, and a coating of four layers, (c)/(b1)/(d)/(b1), wherein layer (b1) is the outermost layer of the overall tube.

The sequence of layers (from the innermost heat-sealing layer (a) to the outermost layer (b1), wherein the resins used for the different layers and, between parentheses, the thickness in microns of each layer are reported below, is as follows:
(a) 80% VLDPE1+20% VLDPE2 (9.1)/
(b) 70% LLDPE1+30% EVA1 (13)/
(e) EVA1 (6.8)/
(c) VdC/MA (4.2)/
(b1) 70% VLDPE3+30% EVA1 (3.8)/
(d) EMAA1 (3.8)/
(b1) 70% VLDPE3+30% EVA1 (4.9)
Total thickness 46 μm

EXAMPLE 6

A seven-layer film has been prepared substantially according to example 1 with the substrate sequence (a)/(b)/(e), wherein the heat-sealing layer (a) is the innermost layer of the tube, and a coating of four layers, (c)/(b1)/(d)/(b1), wherein layer (b1) is the outermost layer of the overall tube.

The sequence of layers (from the innermost heat-sealing layer (a) to the outermost layer (b1), wherein the resins used for the different layers and, between parentheses, the thickness in microns of each layer are reported below, is as follows:
(a) 80% VLDPE1+20% VLDPE2 (9.1)/
(b) 70% LLDPE1+30% EVA2 (13)/
(e) EVA1 (6.8)/
(c) VdC/MA (4.2)/
(b1) 70% VLDPE3+30% EVA2 (3.8)/
(d) EMAA1 (3.8)/
(b1) 70% VLDPE3+30% EVA2 (4.9)
Total thickness 46 μm

EXAMPLE 7

This film is identical to the film of example 4, but the cross-linking effected at a dosage level of 85 instead of 64 kGy.

EXAMPLE 8

A seven-layer film has been prepared substantially according to example 1 with the substrate sequence (a)/(b)/(e), wherein the heat-sealing layer (a) is the innermost layer of the tube, and a coating of four layers, (c)/(b1)/(d)/(b1), wherein layer (b1) is the outermost layer of the overall tube.

The sequence of layers (from the innermost heat-sealing layer (a) to the outermost layer (b1), wherein the resins used for the different layers and, between parentheses, the thickness in microns of each layer are reported below, is as follows:
(a) 80% VLDPE1+20% VLDPE2 (9.1)/
(b) 70% LLDPE1+30% EVA2 (13)/
(e) EVA1 (6.8)/
(c) VdC/MA (4.2)/
(b1) 70% VLDPE3+30% EVA3 (3.8)/
(d) EMAA1 (3.8)/
(b1) 70% VLDPE3+30% EVA3 (4.9)
Total thickness 46 μm

COMPARATIVE EXAMPLE 9

A six-layer film has been prepared substantially according to example 1 with the substrate sequence (a)/(b)/(e), wherein the heat-sealing layer (a) is the innermost layer of the tube, and a coating of three layers, (c)/(e)/(b1), wherein layer (b1) is the outermost layer of the overall tube. The (d) layer characterizing the present films is absent.

The sequence of layers (from the innermost heat-sealing layer (a) to the outermost layer (b), wherein the resins used for the different layers and, between parentheses, the thickness in microns of each layer are reported below, is as follows:

(a) 80% VLDPE1+20% VLDPE2 (9)/
(b) 70% LLDPE1+30% EVA2 (12.8)/
(e) EVA1 (6.8)/
(c) VdC/MA (4.1)/
(e) EVA1 (3.8)/
(b1) 70% VLDPE3+30% EVA2 (8.6)
Total thickness 45.1 μm The films of the present invention (ex. 1-8) and the comparative film according to prior art (ex. 9) have been evaluated according to the following test methods:

Gloss (ASTM D2457), Free Shrink (80° C., ASTM D2732),

Haze after shrink: an internal method was used for this test. The sample preparation followed ASTM D2732, then ASTM D1003 was followed for the haze measurement. At least 3 test specimens for each material were trimmed to a size 15 cm×15 cm, placed in a pair of metal tongs and subjected to shrink process in hot water at 85° C. for 5 seconds and then cooled down in a cold water bath for 5 seconds. The specimen were then let dry, mounted in the sample holder and haze was measured following ASTM D1003.

Tearability: internal test method for linearity of tear. A sample of the tubing is cut (full width by 8 inch long). Using a black permanent marker, a line is drawn about 1 inch from the open end transversally along the width of the sample. Another line is drawn along the length of the specimen perpendicular to the previous line. A 1 inch long slit in the longitudinal direction is made using scissors. The sample is shrunk by immersing it for 3-4 seconds into an hot water tank. Then the sample is removed, the specimens are manually gripped on either side of the slit. One side of the slit tubing is pull towards the body while holding the other side stationary. Tear is linear if it propagates along the black line.

In-line abuse resistance was measured according to an internal test method. The "in-line abuse resistance" is the capability of a structure to withstand without breakage the packaging operations, i. e. loading, vacuumising, sealing, shrinking, and collecting the products through an idle roll conveyor. This is an assessment of the resistance of a material to the mechanical abuse during a packaging operation on a well defined packaging line. The packaging line is standardized (both the components and the layout) so that the results obtained on different samples can be compared. Objective of this test is to provide a method to discriminate and rank bags of different structure at a laboratory level as to their mechanical properties. The procedure to test this property is therefore devised so as to simulate as much as possible the most drastic conditions that might actually occur in the packaging lines. To perform this test, the bags to be examined are filled with metal blocks of constant weight (630 g), vacuumized (residual vacuum below 10 mbar), sealed at the conditions that the skilled in the art is able to set for the specific material under test and shrunk at 85° C. in hot water in a dip tank. The thus obtained packages are then checked for leakers (due to mechanical abrasion and film puncturing) and the in-line abuse resistance is evaluated by the percentage of rejects. This test has a relative meaning and its aim is to indicate whether a given structure is expected to have, at the customer plant, more or less abuse resistance than a standard bag used for comparison.

Puncture resistance at 23° C.: an internal test method was used. The puncture resistance is the resistance force arising when pushing a punch against a surface of flexible film. A film sample is fixed in a specimen holder connected to a compression cell mounted on a dynamometer (an Instron tensile tester); when the test is started, a punch (a punching sphere, 5-mm in diameter, soldered on a plunger) is brought against the film sample at a constant speed (30 cm/min.) and the force needed to puncture the sample is graphically recorded.

Hot wire trimming: an internal test method was used. The "hot wire trimming" test method has been developed to measure the ability of a shrunk bag to be cut by means of a electric wire subject to well defined electrical settings of voltage (10V) and amperage (23 A) for heating the wire. The test is carried out by placing the bag transversally across a sealing bar equipped with hot wire (a standard sealing bar), keeping the current intensity fixed and changing the length (seconds) of the impulse's electrical current. At each impulse time the trimming of the bag is verified: the bag can result fully cut or uncut or partially cut. The shorter is the length of the impulse time (seconds) at which the bag is fully cut, the better is the ability of the material to be trimmed under the described conditions.

Converting TS/WS: the above multilayer films have been converted into rectangular TS or V-shaped (WS process) bags according to conventional processes and machinability has been evaluated.

The results are collected in the following Table 1.

TABLE 1

| Ex n | Haze after shrink (%) | Gloss (g.u.) | Shrink 80° C. LD/TD (%) | Grip & Tear | Convert WS | Convert TS | In-line abuse res. | Puncture at 23° C. (g) | Hot wire trimming (sec) |
|---|---|---|---|---|---|---|---|---|---|
| 1 | 14 | 120.4 | 31/39 | yes | yes | yes | 57% | 8575 | 1.5 |
| 2 | 18 | 126 | 31/39 | yes | yes | yes | 46% | 9350 | 1.2 |
| 3 | 18 | | 31/37 | yes | yes | yes | | | |
| 4 | 16 | 120 | 31/38 | yes | yes | yes | 70% | 7780 | 1.5 |
| 5 | 20 | 108.1 | 32/41 | yes | yes | yes | 80% | | 1.5 |
| 6 | 15 | 121 | 32/38 | yes | yes | yes | 74% | 8425 | 1.5 |
| 7 | 20 | 122 | 30/40 | yes | yes | yes | 70% | 7600 | 1.7 |
| 8 | 14 | 117.5 | 30/40 | yes | yes | yes | 74% | | 1.5 |
| 9 | 15 | 122.7 | 32/40 | yes | no | yes/no | | 8254 | |

Finally the material according to the present invention including EMAA and EMAA blends (ex 1-8) was tested by a panel of intermediate consumers and judged to be more crispy and firm if compared to the prior art formulae (Ex. 9) that did not include EMAA.

From the above results it is evident that the films of the present invention disclose a well balanced mix of properties and, surprisingly, can be used with a packaging machine without undue creasing, folding, seal pleats, edge curls, or jamming.

This very good machinability is much more appreciated with films of lower thickness and/or in case of diagonal seals such as those present in bags of triangular or V shape, commonly used for packaging pieces of hard cheeses such as grana and parmesan.

The present films do not incur in defects during converting such as pluckering—namely curled seals in particular along angled seals—difficult removal of the waste material interposed between two subsequent triangular bags and, after cut, improper formation of the bag chain (i.e. curled bags do not align orderly and are not evenly spaced). Another advantage on the bag making machine is a very good trim cut off, namely a clean cut operated by knives.

The invention claimed is:

1. A multilayer heat-shrinkable film comprising:
   a) an outer heat sealable layer,
   b) a layer comprising a blend of from 80 to 50 weight percent ethylene homopolymer and/or ethylene/alpha-olefin copolymer, with from 20 to 50 weight percent ethylene/vinyl acetate copolymer,
   c) an internal gas-barrier layer, and
   d) a layer comprising a blend of from 80 to 20 weight percent of at least one member selected from the group consisting of acrylate-based resin and acrylic acid-based resin with at least one member selected from the group consisting of ethylene homopolymer, ethylene/alpha-olefin copolymer, and adhesive material.

2. The film according to claim 1 in which the outer heat sealable layer comprises a polyolefin and/or an ethylene/alpha-olefin copolymer.

3. The film according to claim 2, wherein the outer heat sealable layer comprises a member selected from the group consisting of (i) a blend of homogeneous ethylene/alpha-olefin copolymer, (ii) a blend of homogeneous ethylene/alpha-olefin copolymer and linear low density polyethylene, (iii) a blend of homogeneous ethylene/alpha-olefin copolymer with ethylene/vinyl acetate copolymer, (iv) a blend of homogeneous ethylene/alpha-olefin copolymer with ethylene/methyl acrylate copolymer, and (v) a blend of homogeneous ethylene/alpha-olefin copolymer with a polyolefin block copolymer.

4. The film according to claim 1, wherein layer b) comprises a blend of (i) from 75 to 65 weight percent of ethylene homopolymer and/or ethylene/alpha-olefin copolymer with (ii) from 25 to 35 weight percent of ethylene/vinyl acetate copolymer.

5. The film according to claim 1, wherein said internal gas-barrier layer comprises a member selected from the group consisting of polyvinylidene chloride copolymer, polyvinylidene chloride/vinylchloride copolymer, and polyvinylidene chloride/methyl acrylate copolymer.

6. The film according to claim 1, wherein the blend in layer d) comprises the at least one member selected from the group consisting of the acrylate-based resin and the acrylic acid-based resin in an amount of from 70 to 30 percent by weight.

7. The film according to claim 6, wherein the blend in layer d) comprises the at least one member selected from the group consisting of acrylate-based resin and acrylic acid-based resin in an amount of from 50 to 35 percent by weight.

8. The film according to claim 1, wherein the blend in layer d) comprises the acrylate-based resin and the acrylic acid-based resin.

9. The film according to claim 8, wherein layer d) comprises a blend of acrylic acid-based resin with ethylene homopolymer and/or ethylene/alpha-olefin copolymer.

10. The film according to claim 1, wherein layer d) is an internal layer between the outer heat sealable layer a) and the internal gas-barrier layer c).

11. The film according to claim 1, further comprising: e) an internal layer comprising an adhesive material and/or ethylene/vinyl acetate copolymer.

12. The film according to claim 1, further comprising: f) an outer skin layer comprising polyolefin and/or an ethylene/alpha-olefin copolymer.

13. The film according to claim 1, wherein the film has from 4 to 9 layers.

14. A heat shrinkable flexible container obtained by self-sealing the film according to claim 1.

15. The container according to claim 14, in the form of an end-seal bag, a side seal bag, or a pouch.

16. The container according to claim 15, wherein the container is in the form of a V-shaped side-seal bag.

17. The container according to claim 14, further comprising at least one tear initiator.

18. A package comprising a product packaged in a flexible container according to claim 14.

19. A process for making a flexible container according to claim 14, comprising the step of self-sealing a film according to claim 1.

20. The film according to claim 1, wherein layer d) is an internal layer.

21. The film according to claim 12, wherein the outer skin layer f) comprises a blend of a homogeneous ethylene/alpha-olefin copolymer and linear low density polyethylene.

* * * * *